United States Patent
Hinton et al.

(10) Patent No.: US 10,305,882 B2
(45) Date of Patent: May 28, 2019

(54) USING A SERVICE-PROVIDER PASSWORD TO SIMULATE F-SSO FUNCTIONALITY

(71) Applicant: International Business Machines Corporation, Armonk, NY (US)

(72) Inventors: Heather M. Hinton, Austin, TX (US); Kelly Malone, Delmar, NY (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 14/950,394

(22) Filed: Nov. 24, 2015

(65) Prior Publication Data

US 2017/0149767 A1 May 25, 2017

(51) Int. Cl.
*H04L 29/06* (2006.01)
(52) U.S. Cl.
CPC .......... *H04L 63/0815* (2013.01); *H04L 63/10* (2013.01)
(58) Field of Classification Search
CPC ............................ H04L 63/0815; H04L 63/10
See application file for complete search history.

(56) References Cited

U.S. PATENT DOCUMENTS

| | | | |
|---|---|---|---|
| 7,631,346 B2 | 12/2009 | Hinton et al. | |
| 7,950,055 B2 * | 5/2011 | Blinn | H04L 63/0815 726/17 |
| 8,042,162 B2 | 10/2011 | Blakley, III et al. | |
| 8,255,984 B1 * | 8/2012 | Ghostine | G06F 21/41 709/217 |
| 8,365,267 B2 | 1/2013 | Wang et al. | |
| 8,555,078 B2 | 10/2013 | Pravetz et al. | |
| 8,607,322 B2 | 12/2013 | Hinton et al. | |
| 8,838,792 B2 | 9/2014 | McCarty | |
| 9,038,015 B1 | 5/2015 | Allsbrook | |
| 9,246,907 B2 * | 1/2016 | Canning | H04L 63/0815 |

(Continued)

OTHER PUBLICATIONS

Tiwari, Paras Babu, and Shashidhar Ram Joshi. "Single sign-on with one time password." Internet, 2009. AH-ICI 2009. First Asian Himalayas International Conference on. IEEE, 2009.*

(Continued)

*Primary Examiner* — John B King
*Assistant Examiner* — Carlos E Amorin
(74) *Attorney, Agent, or Firm* — Schmeiser, Olsen & Watts, LLP; William Hartwell

(57) ABSTRACT

A system and method for using a Service-Provider password to simulate F-SSO functionality. A processor receives from an F-SSO Identity Provider authentication data for a user who has requested access to a secured service. The service is managed by an F-SSO Service Provider that does not offer F-SSO functionality for that service. Upon receiving the data, the processor redirects the user to an SU-F-SSO portal of the Service Provider, which uses the received authentication data to authenticate the user. The processor sends the user an on-demand password and, when the user uses that password to sign on, the processor matches the entered password with a stored copy of the password that was sent to the user. If they match, the processor grants the user access to the requested service. In some embodiments, the on-demand password may be a single-use password or may be sent to the user via an out-of-band communication.

20 Claims, 8 Drawing Sheets

(56) References Cited

U.S. PATENT DOCUMENTS

| | | | |
|---|---|---|---|
| 2004/0181696 A1* | 9/2004 | Walker | G06F 21/31 |
| | | | 726/6 |
| 2005/0138381 A1 | 6/2005 | Stickle et al. | |
| 2007/0006291 A1 | 1/2007 | Barari et al. | |
| 2012/0011578 A1* | 1/2012 | Hinton | H04L 63/0815 |
| | | | 726/8 |
| 2012/0278872 A1* | 11/2012 | Woelfel | H04L 61/2596 |
| | | | 726/7 |
| 2013/0104202 A1* | 4/2013 | Yin | G06F 21/42 |
| | | | 726/5 |
| 2014/0331273 A1 | 11/2014 | Koneru et al. | |
| 2015/0040190 A1 | 2/2015 | Oberheide et al. | |
| 2015/0074783 A1 | 3/2015 | Clothier et al. | |
| 2015/0134956 A1 | 5/2015 | Stachura et al. | |
| 2015/0312257 A1* | 10/2015 | Antipa | H04L 63/10 |
| | | | 709/225 |
| 2016/0366157 A1* | 12/2016 | Smith | H04L 63/06 |
| 2018/0131686 A1* | 5/2018 | Brannon | H04L 63/0815 |

OTHER PUBLICATIONS

Notice of Allowance (dated Jun. 21, 2017) for U.S. Appl. No. 14/950,622, filed Nov. 24, 2015, Conf. No. 8451.

Patent application for U.S. Appl. No. 14/950,622, filed Nov. 24, 2015, Conf. No. 8451.

Tiwari et al., Single Sign-on with One Time Password, 978-1-4244-4570-7/09, copyright 2009 IEEE, 4 pages.

From Wikipedia, Out-of-band data, https://en.wikipedia.org/wiki/Out-of-band_data, accessed Jun. 1, 2015, 2 pages.

From Wikipedia, One-time password, https://en.wikipedia.org/wiki/One-time_password, accessed Jun. 1, 2015, 6 pages.

McAfee intros single sign-on, one-time password controls for cloud, http://www.zdnet.com/article/mcafee-intros-single-sign-on-one-time-password-controls-for-cloud/, published Apr. 25, 2013, accessed May 29, 2015, 1 page.

* cited by examiner

USING A SERVICE-PROVIDER PASSWORD TO SIMULATE F-SSO FUNCTIONALITY

TECHNICAL FIELD

The present invention relates to providing Single Sign-On (SSO) functionality in a Federated SSO (F-SSO) environment to users of a service for which a Service Provider does not support true F-SSO functionality.

BACKGROUND

Cloud-computing environments and enterprise networks may comprise many software applications and utilities that each requires an independent identification or authentication procedure, such as entering a username and password, providing biometric data, or identifying a security image. In cloud, hybrid-cloud, and other complex computing environments, a user may need to access multiple processing environments or domains, each of which may require the user to re-authenticate itself in order to establish a new session. Higher-security applications that automatically log out inactive users may force a user to sign on and re-authenticate several times during what would otherwise be considered a single session.

Single Sign-On (SSO) functionality can simplify these requirements by means of a third-party entity Identity Provider (IDP) charged with authenticating users and then asserting information about authenticated users to Service Providers and other parties operating within the IDP's domain.

In an environment that supports SSO, an IDP need authenticate a user only once. If an authenticated user then requests access to a service provided by a Service Provider (SP) within the IDP's domain, the IDP will forward the user's authenticating or identifying information directly to the Service Provider. This automated background-authentication procedure may be invisible to the authenticated user, who is then allowed access without being required to manually sign on to the service or otherwise undergo an authentication procedure.

SSO capabilities may be "federated" in a multi-domain environment where services are provided by multiple, often unaffiliated, Service Providers. In a Federated SSO (F-SSO) system, an IDP may use data stored on a trusted "federation server" to identify and authenticate a user to Service Providers that span multiple domains.

In such an F-SSO system, a user may thus, after logging in to an IDP's login portal, be automatically identified, authenticated, and authorized to access multiple applications that each reside on a different platform, are launched from unaffiliated domains, are owned or licensed by different companies, or that are each accessed through a different Service Provider.

Such implementations are especially effective when Service Providers, despite each maintaining a trusted relationship with the Identity Provider, cannot directly share confidential user data because they are not in trusted relationships with each other.

Implementing F-SSO functionality can be expensive and complex, but may be cost-effective in environments where implementation costs can be spread across large numbers of users or a small number of federation partners. F-SSO capabilities might, for example, be especially valuable to privileged users like cloud-management personnel and system administrators, who may support on-premises, off-premises, and hybrid cloud environments. F-SSO allows the Identity Provider to retain ownership of these privileged users throughout their user lifecycle, as there is no need for an independent means of authentication of the privileged user a the Service Provider.

However, such users may need to sign on frequently to multiple secured applications managed by multiple entities, satisfy stringent high-security authentication requirements, or log off an application and then sign back on every time a task must be paused or interrupted.

But because a cloud provider may have thousands or tens of thousands of clients, each of which may have relatively few administrators, it may not be cost-effective for the cloud provider to make the necessary changes to its authentication process and enable F-SSO functionality to support F-SSO for the privileged users of the cloud provider's clients.

BRIEF SUMMARY

A first embodiment of the present invention provides a method for using a Service-Provider password to simulate F-SSO functionality, the method comprising:

a processor of a computer system receiving, from an Identity Provider of an F-SSO federation, notification of a user's request to access a secured service of a Service Provider, where a user-authentication procedure of the Service Provider does not comprise single sign-on functionality for the secured service, and where the notification comprises trusted data that confirms the user's identity and authorizes the user to access the secured service from the Service Provider;

the processor creating an on-demand password as a function of the trusted data;

the processor storing a copy of the on-demand password in a storage location secured by the Service Provider;

the processor transmitting the on-demand password to the user;

the processor redirecting the user to a logon portal of the Service Provider;

the processor accepting from the user, as part of a sign-on procedure performed by the user in order to sign onto the logon portal, a returned copy of the on-demand password;

the processor confirming the user's identity by matching the returned copy of the password to the stored copy of the on-demand password; and the processor, as a function of the confirming, granting the user access to the secured service.

A second embodiment of the present invention provides a Single-Use F-SSO system comprising a processor, a memory coupled to the processor, and a computer-readable hardware storage device coupled to the processor, the storage device containing program code configured to be run by the processor via the memory to implement a method for using a Service-Provider password to simulate F-SSO functionality, the method comprising:

the processor receiving, from an Identity Provider of an F-SSO federation, notification of a user's request to access a secured service of a Service Provider, where a user-authentication procedure of the Service Provider does not comprise single sign-on functionality for the secured service, and where the notification comprises trusted data that confirms the user's identity and authorizes the user to access the secured service from the Service Provider;

the processor creating an on-demand password as a function of the trusted data;

the processor storing a copy of the on-demand password in a storage location secured by the Service Provider;

the processor transmitting the on-demand password to the user;

the processor redirecting the user to a logon portal of the Service Provider;

the processor accepting from the user, as part of a sign-on procedure performed by the user in order to sign onto the logon portal, a returned copy of the on-demand password;

the processor confirming the user's identity by matching the returned copy of the password to the stored copy of the on-demand password; and the processor, as a function of the confirming, granting the user access to the secured service.

A third embodiment of the present invention provides a computer program product, comprising a computer-readable hardware storage device having a computer-readable program code stored therein, the program code configured to be executed by a system comprising a processor, a memory coupled to the processor, and a computer-readable hardware storage device coupled to the processor, the storage device containing program code configured to be run by the processor via the memory to implement a method for using a Service-Provider password to simulate F-SSO functionality, the method comprising:

the processor receiving, from an Identity Provider of an F-SSO federation, notification of a user's request to access a secured service of a Service Provider, where a user-authentication procedure of the Service Provider does not comprise single sign-on functionality for the secured service, and where the notification comprises trusted data that confirms the user's identity and authorizes the user to access the secured service from the Service Provider;

the processor creating an on-demand password as a function of the trusted data;

the processor storing a copy of the on-demand password in a storage location secured by the Service Provider;

the processor transmitting the on-demand password to the user;

the processor redirecting the user to a logon portal of the Service Provider;

the processor accepting from the user, as part of a sign-on procedure performed by the user in order to sign onto the logon portal, a returned copy of the on-demand password;

the processor confirming the user's identity by matching the returned copy of the password to the stored copy of the on-demand password; and the processor, as a function of the confirming, granting the user access to the secured service.

DETAILED DESCRIPTION

Figure 1:
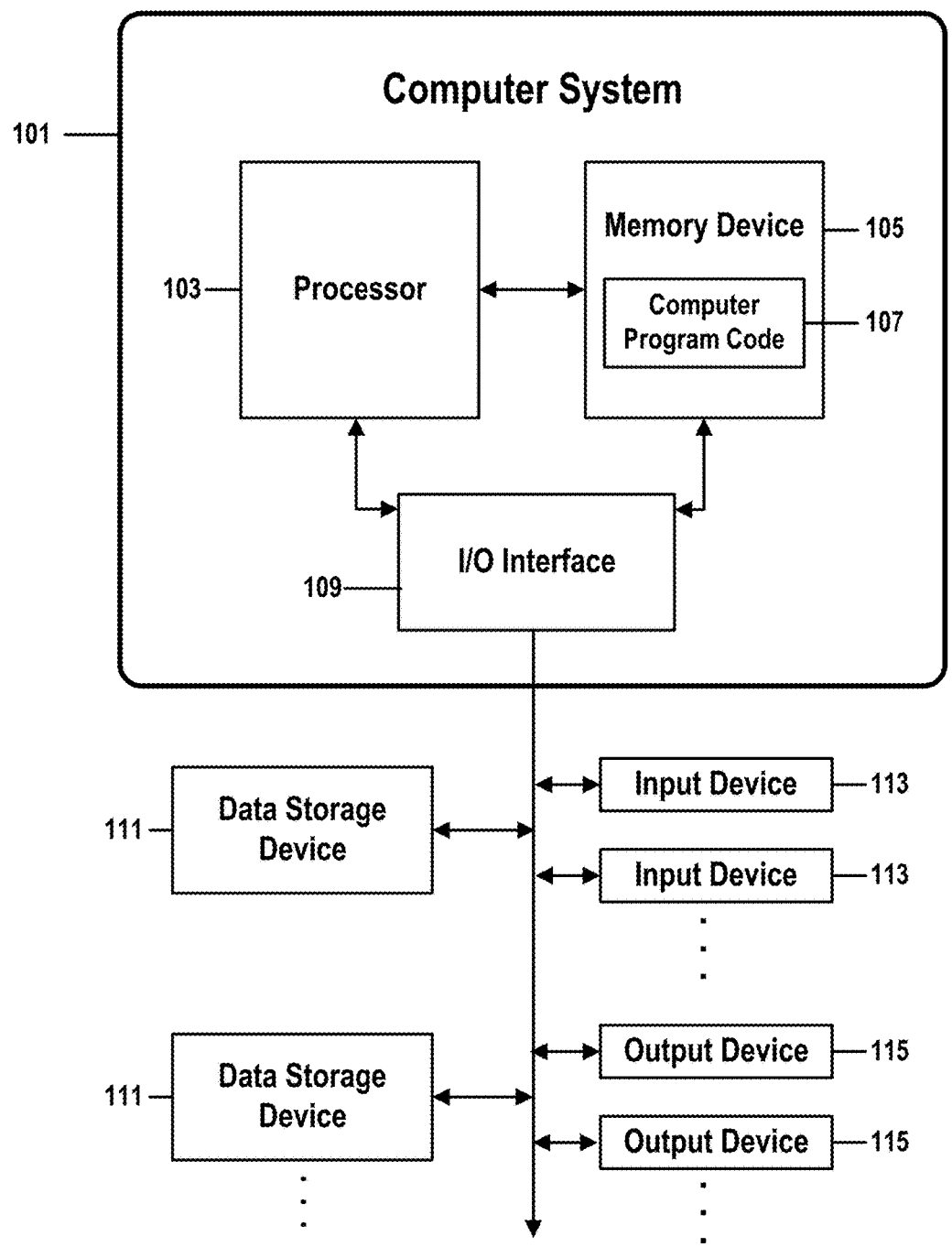
FIG. 1 shows a structure of a computer system and computer program code that may be used to implement a method for using a Service-Provider password to simulate F-SSO functionality in accordance with embodiments of the present invention.

Single sign-on (SSO) is a procedure that allows a user to access multiple software applications or networked resources with a single log-in or authentication procedure. It frees the user from having to enter a different username and password, or perform another type of authentication procedure, when logging on to each application or service. In a simple example, it may be possible to use HTTP cookies to add SSO functionality to a set of applications that share a common DNS parent domain.

A federated single sign-on (F-SSO) system extends SSO capabilities across multiple domains. F-SSO may comprise use of federated identities (identities that are linked across domains and that may be stored in a "federated" server) and may comply with standard, interoperable conventions and protocols, such as the Security Associated Markup Language (SAML), which may be used to format "assertion" messages that may pass user identities and information about those identities, across distinct, linked domains.

An F-SSO procedure may involve interaction among a federation of parties that comprise: a principal (typically an end-user), one or more Identity Providers (IDPs), and one or more service providers (SPs).

In a typical configuration, when a user requests a service from a service provider, that SP in turn requests information about the user from an identity provider. The IDP then retrieves user information from a federated server, or from another source accessible to the IDP, and returns the retrieved information to the SP. In some embodiments, the returned user information may be communicated from the IDP to the SP in a form that complies with a standard protocol or convention, such as SAML.

The SP then validates the returned information and will use it to determine whether to allow the user access to services provided by the SP. In this way, F-SSO frees a user from having to re-authenticate its account with an SP every time the user wishes to access a service provided by the SP.

F-SSO thus enables seamless single sign-on access to services and applications that may span multiple enterprises, cloud environments, or other types of computing environments. F-SSO protocols are often implemented as part of a broader "Federated Identity management" (FIM) system that may comprise multiple Identity Providers and Service Providers operating in multiple domains.

Here, an Identity Provider (IDP) is responsible for maintaining a user's lifecycle credentials, including authentication credentials and role/permission information. Through pre-established trust relationships with Service Providers, the IDP is able to assert user information to each trusted SP, allowing the SP to authorize, initiate, and manage sessions with those users without having to manage user accounts, authentication credentials, and authorization permissions.

In some implementations, an IDP may maintain trust relationships with multiple SPs, and an SP may have trust relationships with multiple IDPs. Multiple FIM systems may further form a broader "federation" that can allow a user access to multiple systems and services deployed throughout the federation, including systems and services deployed on different cloud-computing environments and across different enterprises.

In some F-SSO-enabled implementations, a user may access a Service Provider's services by signing on to the IDP, which then independently authenticates the user and communicates that authentication, and optionally the user's role and privileges, to the intended Service Provider through a trusted relationship.

Despite its strengths, F-SSO can be very expensive to manage for implementations supporting very large numbers of federation partners. When an SP or IDP is in trust relationships with a relatively small number of federated partners, each of which may serve a relatively large number users, the operational burden of managing these trust relationships is more easily justified.

But when one Service Provider must interact with thousands of IDP partners, the task of managing so many trust relationships may become burdensome for the SP. Furthermore, if each IDP in such a scenario has a small number of users, the SP cannot cost-effectively amortize the cost of managing each trust relationship across a sufficiently large enough number of users. In such a case, a cost to modify a logon portal of the SP to add support for F-SSO single sign-on to members of a federation becomes difficult to justify. This is especially true when the portal and associated environment must undergo significant changes, or incur expenses related to costs of information-gathering, coding and design, authenticating users' security profiles, or deploying infrastructure, in to support F-SSO protocols. Consequently, sophisticated federated SSO capabilities are generally not implemented in such cases.

If, for example, an Infrastructure-as-a-Service (IaaS) cloud provider acts as a Service Provider for tens of thousands of clients, each of those clients may wish to act as an Identity Provider for a relatively small number of the client's users. Here, the SP would be forced to configure and manage trusted relationships with an enormous number of IDPs, and would not be able to spread the cost of setting up each relationship across a sufficiently large number of users. Implementing F-SSO in this case would thus be prohibitively expensive.

The present invention addresses such issues, allowing a cloud provider, or other similarly situated Service Provider, to maintain a trust relationship with each of its clients, thus allowing the SP to treat each client as a federated Identity Provider (IDP).

As is known in the art, an IDP may authenticate a user, as a function of the IDP's authentication policy, in response to receiving a Service Provider authentication request, which specifies the SP's authentication policy. In an F-SSO federation, this procedure may be triggered by the user's request to the SP to access a service or other resource provided by the SP. If the SP determines that the user in question is part of a trust relationship with a trusted IDP, the SP may respond by sending the IDP a request for federated single sign-on. Authentication of the user might then take place at the IDP side, and will cause a trusted assertion to be returned to the SP, where said assertion will contain information about the user's identity and attributes, allowing the SP to then create and associate this information with the resulting user session.

Some Service Providers may be unable to extend their authentication procedures to accommodate the above steps of receiving and processing federated single sign-on protocol exchanges from an Identity Provider. Embodiments of the present invention may further address this issue by allowing a Service Provider to offer F-SSO-like single sign-on capabilities without revising the SP's existing native user-authentication procedures.

FIG. 1 shows a structure of a computer system and computer program code that may be used to implement a method for using a Service-Provider password to simulate F-SSO functionality in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for using a Service-Provider password to simulate F-SSO functionality in accordance with embodiments of the present invention, and may implement other embodiments described in this specification, including the methods illustrated in FIGS. 1-8. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for using a Service-Provider password to simulate F-SSO functionality.

Any of the components of the present invention could be created, integrated, hosted, maintained, deployed, managed, serviced, supported, etc. by a service provider who offers to facilitate a method for using a Service-Provider password to simulate F-SSO functionality. Thus the present invention discloses a process for deploying or integrating computing infrastructure, comprising integrating computer-readable code into the computer system 101, wherein the code in combination with the computer system 101 is capable of performing a method for using a Service-Provider password to simulate F-SSO functionality.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for using a single-use out-of-band password to simulate F-SSO functionality in a non-F-SSO environment may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for using a single-use out-of-band password to simulate F-SSO functionality in a non-F-SSO environment data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
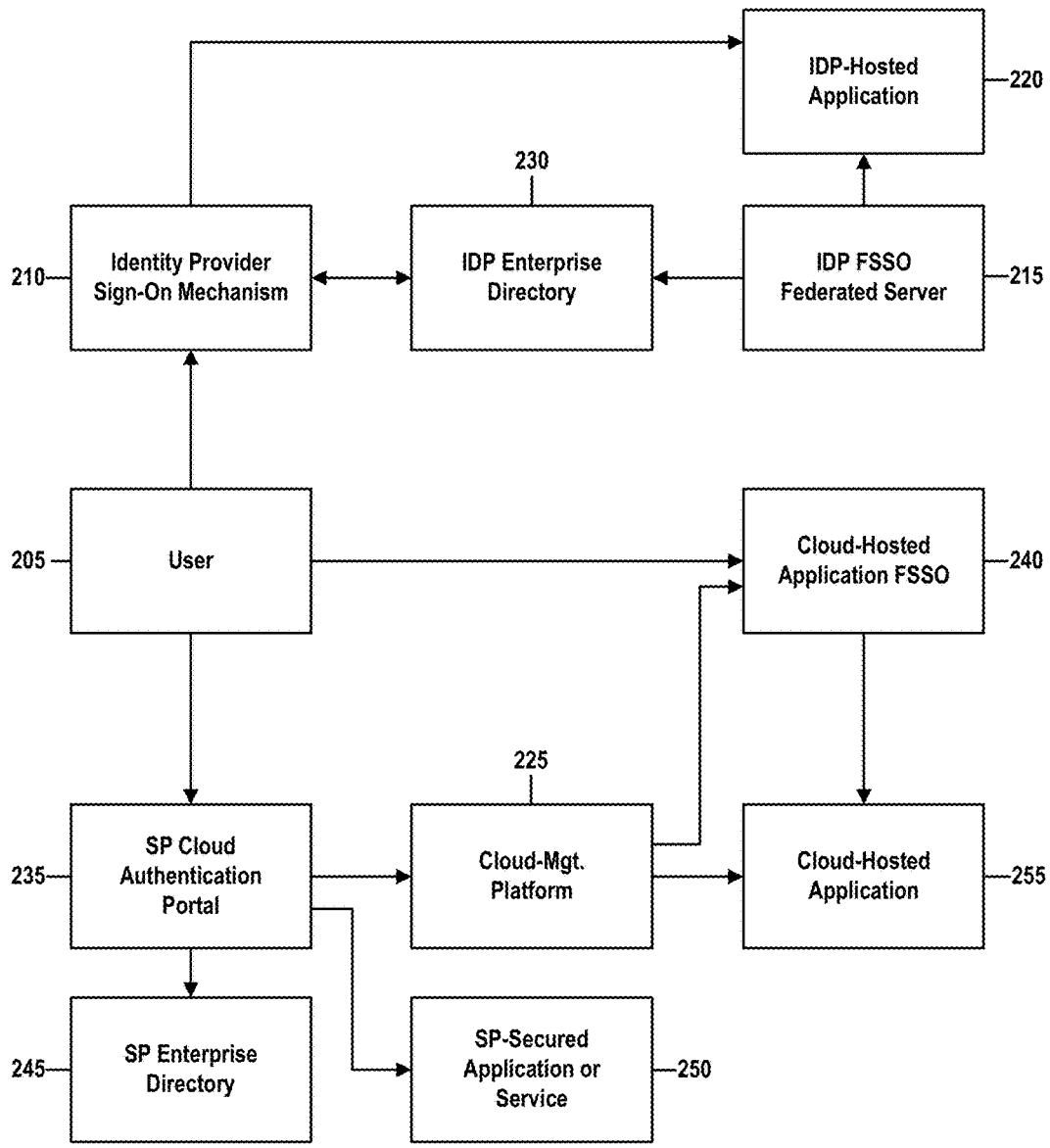
FIG. 2 shows an example of a conventional Federated Single Sign-On system (F-SSO) architecture that is implemented within a hybrid cloud environment provided by an an IaaS provider or other type of cloud-service provider.

FIG. 2 shows an example of a conventional Federated Single Sign-On system (F-SSO) architecture that is implemented for a hybrid cloud environment provided by a cloud Service Provider, such as an IaaS provider. FIG. 2 comprises elements identified by reference numbers 205-255.

In this example, a user 205 wishes to sign on to two different applications: a first application 220 that is hosted and managed by a Identity Provider and a second application 240 that is hosted at the Service Provider but is managed by the Identity Provider. Here, the IDP might be a client of the SP such that the IDP hosts a Web-based cloud application or service on the SP's cloud-computing platform.

In this example, user 205 is known to the IDP by means of an IDP-managed user account that stores identification and authentication credentials associated with the user. This user-account information may be stored in an Enterprise Directory 230 or in another storage repository accessible to the IDP. In some embodiments, the Enterprise Directory 230 may exchange data with federated server 215.

First application 220 might, for example, be a Website, a Web application, or another resource. User 205 may access first application 220 by providing authentication credentials, such as a username and password, to the IDP's Sign-On Mechanism 210. IDP Sign-On Mechanism 210 will then identify the user and validate the user's credentials against user-account information stored in the IDP Enterprise Directory, 230. When successfully authenticated, the IDP will allow the user to enter a validated session that may be associated with information about the user's permissions and roles within the IDP environment.

The IDP-side first application 220 may include a link or a reference to a Service Provider-hosted service, such as a cloud-hosted application 255, that is managed by the Client but hosted at the Service Provider's IaaS service. When the user attempts to use such a link to access SP-hosted application 255, the IDP-hosted application 220 may automatically redirect the user to the SP-hosted cloud application 255.

In the example of FIG. 2, this redirection may be performed by means of F-SSO protocols that allow the user to access the SP-side cloud-hosted second application 255 without being forced to perform a second sign-on and authentication procedure. Because both IDP-hosted application 220 and cloud-hosted application 255 are enabled for F-SSO, the IDP may establish an F-SSO relationship to the cloud-hosted application 255 through an IDP-instance of an F-SSO hosted by the IDP's cloud-hosted F-SSO agent or application, 240.

If, on the other hand, a user 205 wishes to access a third, SP-secured, application 250 that is provided, hosted, or otherwise managed by the Service Provider, rather than by an IDP, that third application 250 may not be enabled for F-SSO and single sign-on. The user, therefore, will be allowed to access the third application 250 only after providing a second set of sign-on and authentication credentials to the SP through a sign-on portal 235 deployed by the SP by means of the SP's cloud-management platform 225. This sign-in and authentication credentials and procedures may be specific to the Service Provider and may be managed by the Service Provider as a function of information stored in the Service Provider's own Enterprise Directory 245.

Figure 3:
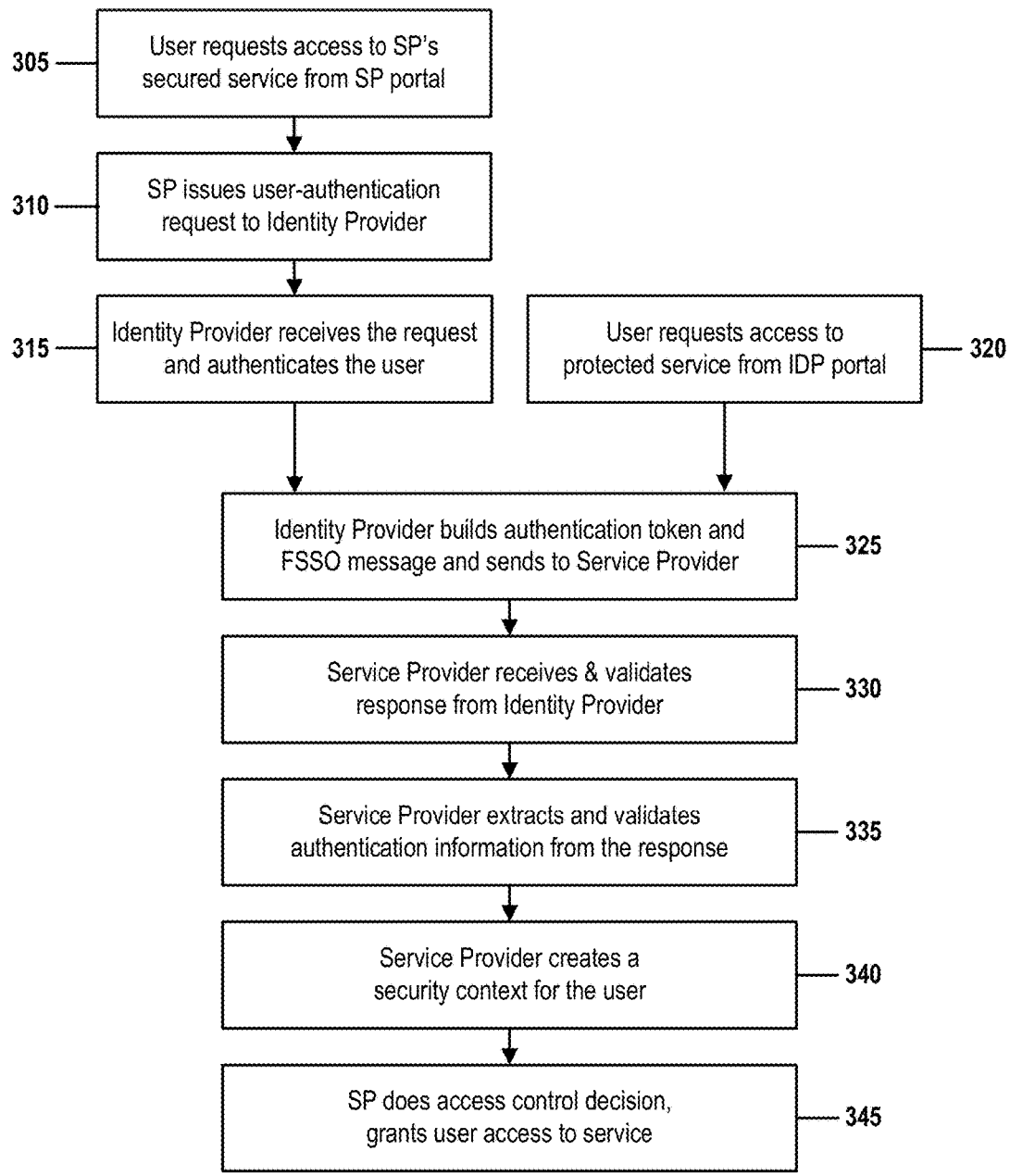
FIG. 3 is a flow chart that illustrates steps of a method by which a conventional Federated Single Sign-On system (F-SSO) architecture, such as that shown in FIG. 2, operates.

FIG. 3 is a flow chart that illustrates steps of a method by which a typical Federated Single Sign-On system (F-SSO) architecture, such as that shown in FIG. 2, operates. FIG. 3 contains steps 305-345.

In step 305, a user 205 requests access to one or more applications or services 250 provided by a Service Provider. This request may be performed by any means known in the art, such as by clicking an HTTP hyperlink, launching an application, or manually selecting a feature of a software application.

In step 310, the Service Provider determines that the user is participating in a federated relationship with an Identity Provider. In response, the SP creates an F-SSO request for user-authentication and forwards that request to the Identity Provider. This request may be formatted in compliance with a standard or open format, protocol, or convention, such as SAML.

The SP then forwards this request for user-authentication to the IDP and may redirect user 205 to the IDP's sign-on Web site or other sign-on mechanism 210. In some implementations, this redirection may be invisible to the user 205, who may perceive that the user is still working on the SP's application.

In step 315, the Identity Provider receives the SP's F-SSO request from the Service Provider. If the user does not have a currently valid session with the IDP, the IDP then authenticates the user, using any combination of identification or authentication methodologies known in the art, such as a mechanism based on a username/password combination, biometric markers, or a keyfob.

Step 320 describes an alternate means by which a user 205 may request access to an SP service, this time initiating that request from an IDP hosted application or service 220, rather than from a resource or service of the Service Provider. This method is simpler than the analogous procedure of steps 305-315 because it requires no authentication request to be sent from the SP to the IDP. Instead, the IDP authenticates the user, using information stored in its own enterprise directory 230, federated server 215, or other information repository.

In step 325, the IDP creates an authentication token, such as a SAML assertion, and an accompanying F-SSO message in response to user 205's service request in step 305 or 320. The IDP then returns the assertion and message to the Service Provider and redirects user 205 to the Service Provider.

In step 330, the Service Provider receives the F-SSO message sent by the IDP in step 325, including the authentication token. Upon receipt, the SP also validates the message, a procedure that may comprise confirming that the message and token are properly signed and that a trusted relationship exists between the SP and the IDP.

In step 335, the SP extracts from the F-SSO message received in step 330 information required to authenticate the user 205. This information may comprise a user identifier, an access-control list, security levels associated with user 205, the user's job function, or identification of groups to which the user 205 belongs. Here, the SP may perform a detailed validation of each extracted data item in order to ensure that the F-SSO message and authentication token are legitimate.

In step 340, the Service Provider creates and stores security and session information for user 205, sometimes referred to as a "security context" of user 205. In some implementations, creating and storing this context may comprise saving an HTTP cookie file on the user 205's computer.

In step 345, the Service Provider, based on the results of its validation and authentication in steps 330 and 335, determines whether to grant user 205 access to the requested resource.

Figure 4:
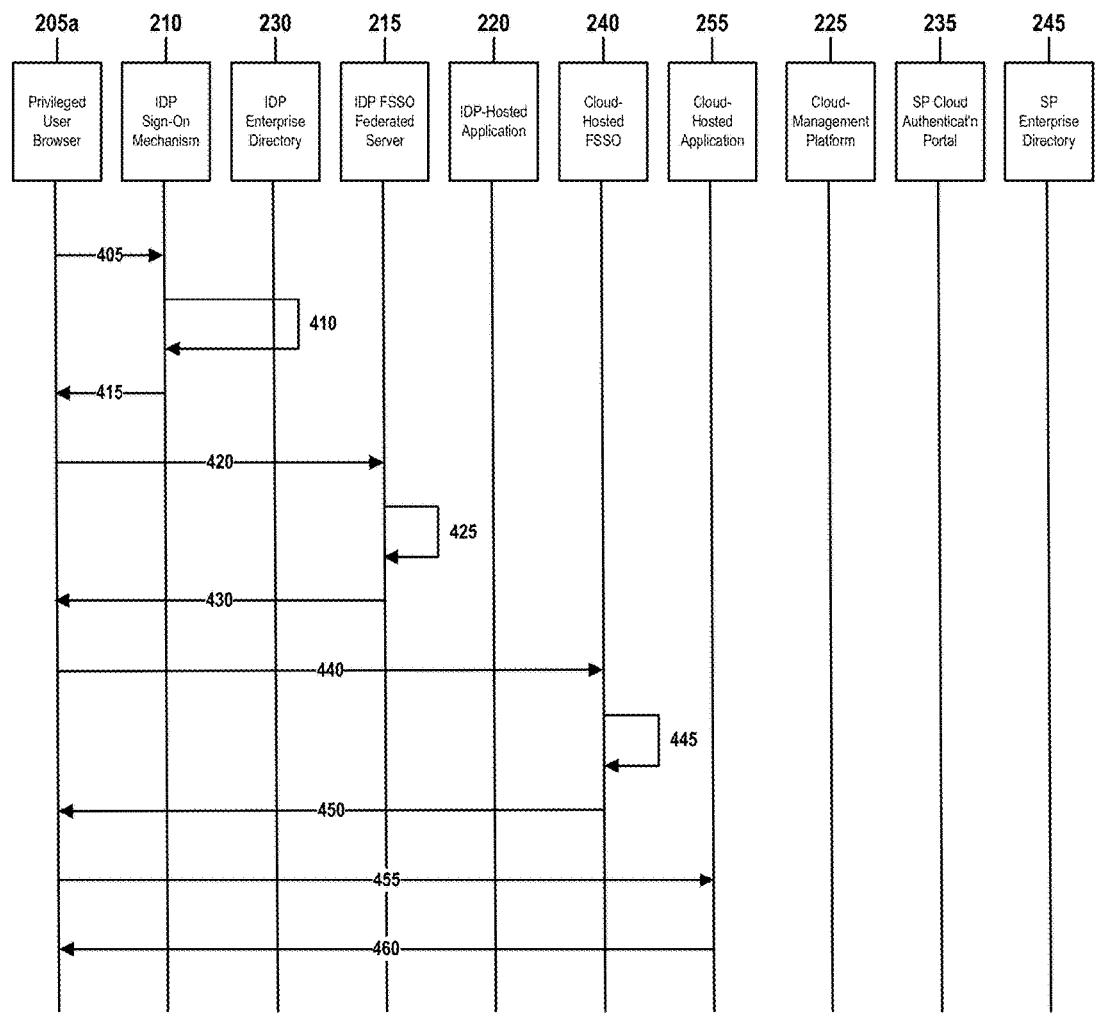
FIG. 4 shows information flows among components of the conventional F-SSO system architecture of FIG. 2.

FIG. 4 shows information flows among components of the conventional F-SSO system architecture of FIG. 2. FIG. 4 comprises reference items 205a-255 and 405-460.

Items 210-255 are similar in form and function to similarly numbered items in FIG. 2. Item 205a represents a browser of a privileged user who may belong to a relatively small subclass of users 205.

FIG. 4 describes a flow for F-SSO between the IDP's Sign-On mechanism (210) and the IDP's cloud hosted resource 255. FIG. 4. does not describe information flows to or from cloud-management platform 225 and Service Provider enterprise directory 245 because the Service Provider's Sign-On Portal is not enabled for F-SSO.

In flow 405 privileged user 205a initiates an authentication request at the IDP through sign on portal 210. This user authentication may comprise sign-on or other types of authentication information such as a username and password or a biometric marker.

In flow 410, the IDP Sign-On Mechanism 210 validates the authentication information presented by the user against the information stored in the IDP's enterprise directory 230 in order to authenticate the user's response.

In flow 415, the IDP Sign-On Mechanism 210 responds to the user's successful authentication request with session information. This session information is a function of the authentication of user 205a by means of the IDP's authentication procedures and other information stored in IDP enterprise directory 230. At the conclusion of this step, the user is now authenticated and able to access resources within the IDP's environment.

In flow 420, the user sends an access request to the IDP F-SSO server 215 as the first step in accessing Cloud-Hosted Application 255. IDP Sign-On Mechanism 210 may then access the IDP's F-SSO Federated Server 215.

In flow 425, the IDP F-SSO Federated Server 215 builds an F-SSO message for Cloud-Hosted F-SSO mechanism 240 that includes appropriate credentials for the user that are based on the user's session information In flow 430, the IDP transmits data to the IDP-authenticated Privileged User 205a in order to begin redirecting user 205a to F-SSO-enabled Cloud-Hosted F-SSO mechanism 240, which is hosted by the Service Provider and managed by the IDP.

In flow 440, the redirection of user 205a to the Cloud-Hosted F-SSO mechanism 240 is completed and user 205a begins exchanging information with Cloud-Hosted F-SSO mechanism 240.

In flow 445, the Cloud-Hosted F-SSO mechanism 240 validates the F-SSO message, unpacks an F-SSO assertion from the validated message, and configures a local session for the user In flow 450, the cloud-hosted F-SSO mechanism 240 redirects the F-SSO authenticated user 205a to the IDP's Cloud-Hosted Application 255, as originally requested by the user 205a in flow 405. Here, the IDP may open a local session for user 205a in accordance with a configuration derived by Cloud-Hosted F-SSO mechanism 240.

In flow 455, the user is redirected to the IDP's Cloud-Hosted Application 255 for completion of user 205a's initial request in flow 205.

In flow 460 the Cloud-Hosted Application 255 may directly transmit to user 205a a response to user 205a's request to access application 255. User 205a, now authenticated by the IDP within domains of both the IDP and the SP, is now granted access to the requested application 255 for the remainder of the user 205's session.

Figure 5:
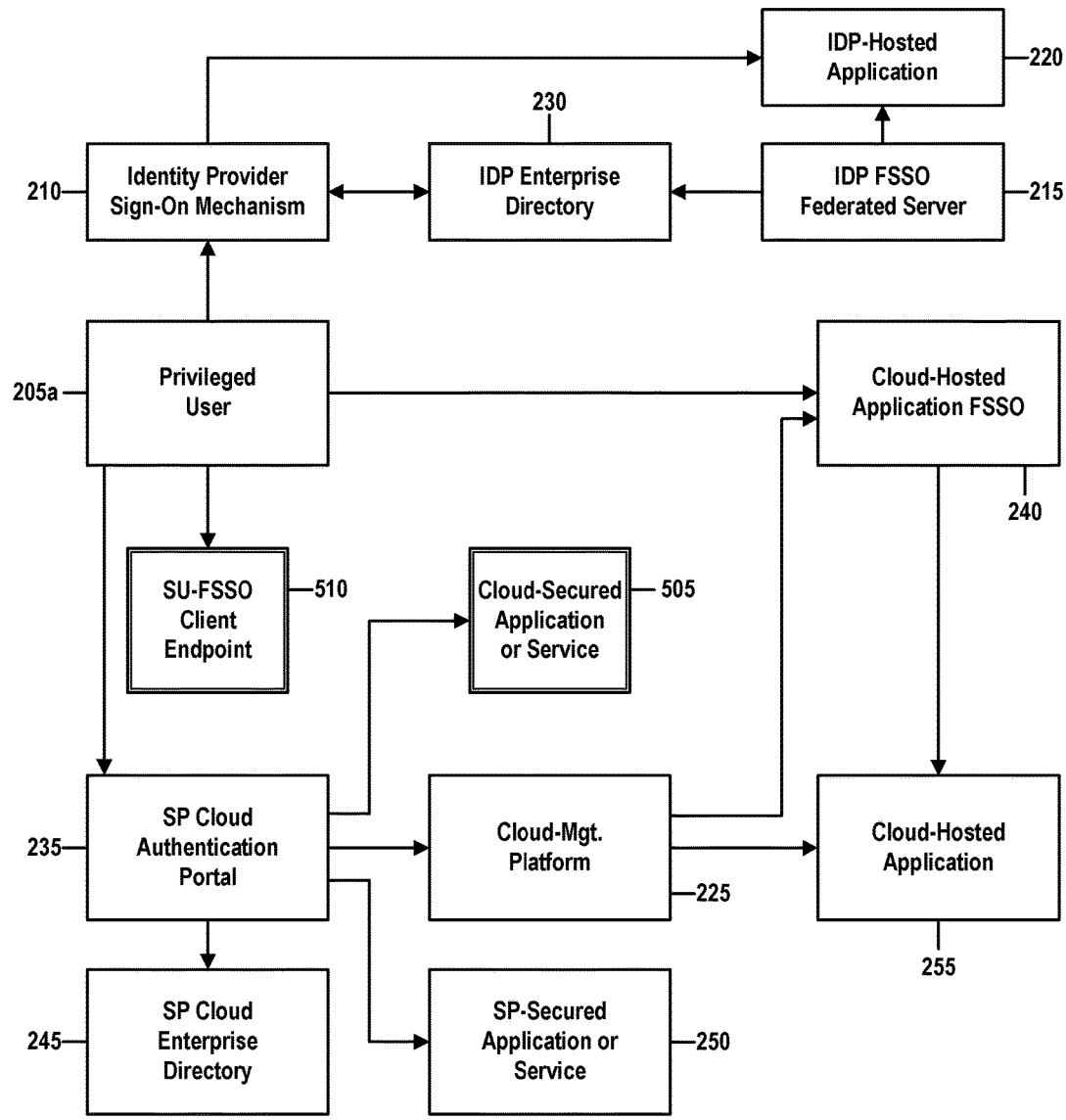
FIG. 5 shows an enhanced version of the Federated Single Sign-On system of FIG. 2 in accordance with embodiments of the present invention.

FIG. 5 shows an enhanced version of the Federated Single Sign-On system of FIG. 2 in accordance with embodiments of the present invention. FIG. 2 comprises elements identified by reference numbers 205a-255 and 505-510.

Items 210-255 are similar in form and function to similarly numbered items of FIG. 2. Item 205a is similar in form and function to item 205a of FIG. 4

Item 510 identifies a novel endpoint deployed by embodiments of the present invention within a scope of a domain of a Service Provider. In such embodiments, this "Single-Use F-SSO" (SU-F-SSO) client endpoint 510 is enabled for F-SSO protocol-handling and is directly accessible by a user 205a as an addressable endpoint not hidden behind the Service Provider's cloud sign-on portal 235.

Because this SU-F-SSO endpoint 510 is an application that is under the Service Provider's direct control and is part of an overall trust domain of the SP, the SP may with confidence trust it to maintain and manage the federation protocols and the SP's trust relationships with Identity Providers (including a trust relationship between the SP and an IDP that is associated with privileged user 205a). As will be explained below, embodiments of the present invention may thus use this SU-F-SSO endpoint 510 to simulate F-SSO functionality in a non-F-SSO environment.

SU-F-SSO endpoint 510 performs a novel combination of functions. In addition to managing F-SSO trust relationships between the Service Provider and one or more Identity Providers, it may also access the Service Provider's cloud-based enterprise directory 245, and may be authorized to perform user password-management chores, such as setting, resetting, and validating passwords associated with user 205a.

These capabilities allow SU-F-SSO endpoint 510 to simulate F-SSO capabilities by managing F-SSO communications with the IDP's federated server 215, and to interact with the user 205a and the service Provider's cloud-based sign-on portal 235.

Such an SP-based F-SSO simulation may allow an IDP to retain control over all aspects of a user 205a's security status, including the user 205a's's specific permissions and the user 205a's overall account status, which might identify the user 205a's account as being enabled, disabled, or terminated. This simulation further allows a cloud-provider Service Provider to provide F-SSO-like capabilities without altering or recoding sections of its sign-on portal 235. In such a scenario, a user 205a might still enter a password into the portal 235, but this password would be one that user 205a does not have to remember or synchronize with other passwords, eliminating vulnerabilities associated with re-used, weak, or poorly secured passwords.

Furthermore, because user 205a might be notified of this password only as part of an F-SSO exchange between the IDP and the SP, this mechanism of FIG. 5 may help an IDP prevent an unauthorized user 205a from using the password to access a secured SP service after the IDP has altered user 205a's security status to an unauthorized status.

Instead, in response to an F-SSO request from an IDP to the SU-F-SSO endpoint 510, the endpoint will create an "on-demand" password for the user, update the Service Provider's enterprise directory 245, construct a response to the user 205a, and then, through the Service Provider's cloud-based sign-on portal 235, redirect the user 205a to a requested resource, such as the cloud-hosted application 225 or a cloud-secured application 505.

As part of this redirection, user 205a may receive the new on-demand password as part of an HTTP message, as a response comprised by a web form, or as part of an HTTP header that is redirected directly to the Service Provider's cloud-based sign-on portal 235.

The user would then be redirected to the SP's portal 235, which would request and receive a username and password from the user, and then use information stored in the SP's enterprise directory 245 to authenticate that username and password.

Upon successful authentication, user 205a would be allowed access to the requested resource, which also includes permissions to associated back-end applications, such as the cloud-management platform 225 or a Cloud-Secured Application 505.

In some embodiments, the on-demand password may be a single-use, or, one-time-use password that automatically expires once it has been used. In such embodiments, if user 205a experiences an inactivity time-out or other event that requires re-authentication with the Service Provider, the user 205a would be forced to re-initiate the entire F-SSO procedure through its Identity Provider.

In one embodiment, this on-demand password is re-usable, so that if the user 205a experiences an inactivity time out or other action that requires re-authentication by the SP, the user may reuse this on-demand password for re-authentication instead of triggering an additional F-SSO flow between the IDP and the SU-F-SSO.

In another embodiment, the on-demand password may be re-usable for a period of time, such as for the duration of the user 205a's SP-managed F-SSO session. Such embodiments may, for example, allow user 205a to re-use this password during a session that has been interrupted by inactivity timeouts, thus freeing the user from having to restart an SP/IDP interaction in order to generate a new password.

In yet other embodiments, the on-demand password may be set to be re-usable only a certain number of times, or for a given time period. Such embodiments would not force a user 205a to reinitiate an F-SSO procedure when a valid session is merely interrupted, but would prevent user 205a from extending a session indefinitely with a single password.

In still other embodiments, the on-demand password may be configured to be used a limited number of times, for a limited period of time, or to gain access to only a limited class of services.

In yet another variation, the on-demand password might be "locked-down" or further secured, such that, when the user 205a enters it into the SP sign-on portal 235, the portal 235 may perform additional verification procedures to confirm that the password has been entered by a party for which it was intended. Such procedures might, for example, determine whether an IP address that issued the original request associated with the password is the same IP address asserted by the IDP as belonging to the current user 205a and as being included in the single-sign-on assertion from the IDP to the SU-F-SSO endpoint 510.

Figure 6:
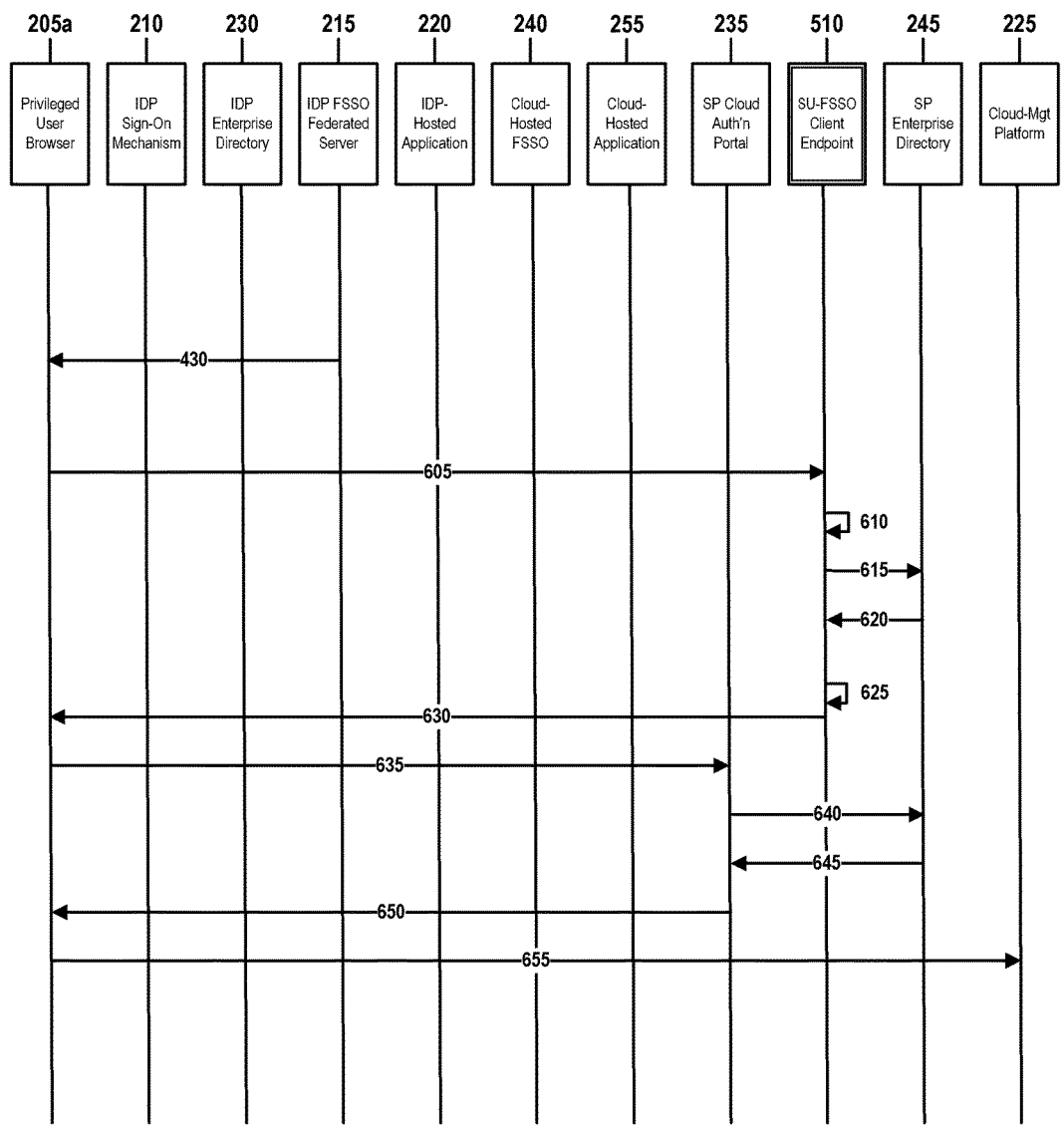
FIG. 6 shows information flows among components of the novel SU-F-SSO architecture of FIG. 5.

FIG. 6 shows information flows among components of the novel SU-F-SSO architecture of FIG. 5. FIG. 6 comprises reference items 205a-255, 430, 510, and 605-655.

Items 210-255 are similar in form and function to similarly numbered items in FIGS. 2 and 4. Item 205a is similar in form and function to item 205a of FIG. 4. Item 510 is similar in form and function to item 510 of FIG. 5.

Additional information flows may be incorporated into the implementation depicted in FIG. 6. For example, information flows for conventional F-SSO interactions between a user 205 and one or more IDPs may be incorporated, similar in form and function to information flows 405-425 as shown in FIG. 4.

Information flows 605-655 depict novel SU-F-SSO enhancements to a conventional F-SSO implementation, as depicted in FIGS. 2-4. These enhancements comprise addition of a new Service Provider-managed SU-F-SSO endpoint 510, which, in SU-F-SSO-enabled systems, assumes much of the role played by the SP-managed cloud-hosted F-SSO endpoint 240 in conventional systems.

Additional information flows (not shown), similar to information flows 405-425 of FIG. 4, describe steps in which a user 205a requests access to a Service Provider's secured service or other resource by signing on to an IDP's sign-on mechanism or portal 210. When the user 205a responds to the IDP's request for sign-on credentials, the IDP, through its sign-on mechanism 210, authenticates the user 205a, using information culled from the IDP's enterprise directory 210 or from the F-SSO federation's federated server 215. Upon authentication, the IDP builds an F-SSO message (such as an SAML assertion) that identifies credentials for the IDP-authenticated user 205a. Information flow 430, similar to FIG. 4, depicts the first step of the conventional F-SSO flow from the IDP to the SP.

In FIG. 6, this procedure continues with information flow 605, in which the IDP redirects authenticated user 205a to novel SU-F-SSO endpoint 510. Here, the IDP forwards its F-SSO message to the Service Provider controlled SU-F-SSO endpoint 510, rather than to the IDP's Cloud-Hosted F-SSO endpoint 240.

This novel approach may allow an IDP to retain control of user access without altering its normal procedures; may allow a Service Provider to offer simulated F-SSO functionality without modifying existing sign-on procedures; may strengthen overall security by requiring a user 205a to enter an SP-defined password in order to access SP-provided services; and may increase flexibility of the both the IDP's (Client's) and the SP's (Cloud Provider's) security systems by accommodating passwords that may be configured to persist for only an expected duration of a session or that may be constrained in other ways, as described in FIG. 5.

In flow 610 the SU-F-SSO endpoint 510, through its communication with user 205a, confirms and validates its asserted trust relationship with the IDP, unpacks user-identifying information from F-SSO message received from the IDP, uses this information to identify the user 205a, and configures an on-demand password for the user 205a.

In flow 615 the SU-F-SSO endpoint 510 uses a cloud-specific API or a known protocol, such as Lightweight Directory Access Protocol (LDAP), to update the Service Provider's cloud-hosted enterprise directory 245 with the one-time password. As mentioned earlier, this enterprise directory 245 may be any kind of database or information repository, such as a distributed directory conforming to the LDAP protocol.

In flow 620, the Service Provider's enterprise directory 245 confirms to the SU-F-SSO client 510 that its stored record of the password has been updated.

In step 625 the SU-F-SSO endpoint 510 builds its response to the authenticated user 205a. This response may comprise the on-demand password and additional information about the requested cloud-hosted application or service 225. As described in FIG. 5, this on-demand password may be a single-use password or may be constrained in other ways.

In flow 630 the SU-F-SSO endpoint 510 transmits its response to user 205a, which includes the on-demand password.

In flow 635, the SU-F-SSO endpoint 510 redirects user 205a to the Service Provider's sign-on portal 235. There, the user 205a uses the received on-demand password to sign on to the requested Service Provider Authentication Portal 235.

In flow 640, the sign-on portal 235 queries the SP's Enterprise Directory 245 for information required to authenticate the on-demand password entered by the user 205a.

In flow 645, the SP enterprise directory 245 responds with information allowing the SP's sign-on portal 235 to confirm that the password is valid and that the user 205a has been authenticated. At this time, the sign-on portal 235 may also configure session information for the user 205a, if such information had not been provided by the SU-F-SSO endpoint 510.

In flow 650, the Service Provider sends session-configuration information to user 205a that allows user 205a to access the requested Cloud-Hosted Application 255. Although not shown in FIG. 6, the Service Provider may also at this time provide additional session or security-related information needed to create a session to cloud-management platform 225 or to the requested application 255.

In flow 655, the user 205a, having been granted access to the requested resource 255 as a function of IDP's and SP's authentication procedures, is redirected by the SP Cloud-Authentication Portal 235 to the requested Cloud-Hosted Resource 255. In embodiments shown in FIG. 6, this redirection is performed indirectly through a cloud-management platform 225 that may manage infrastructure and cross-domain access on the cloud platform.

Figure 7:
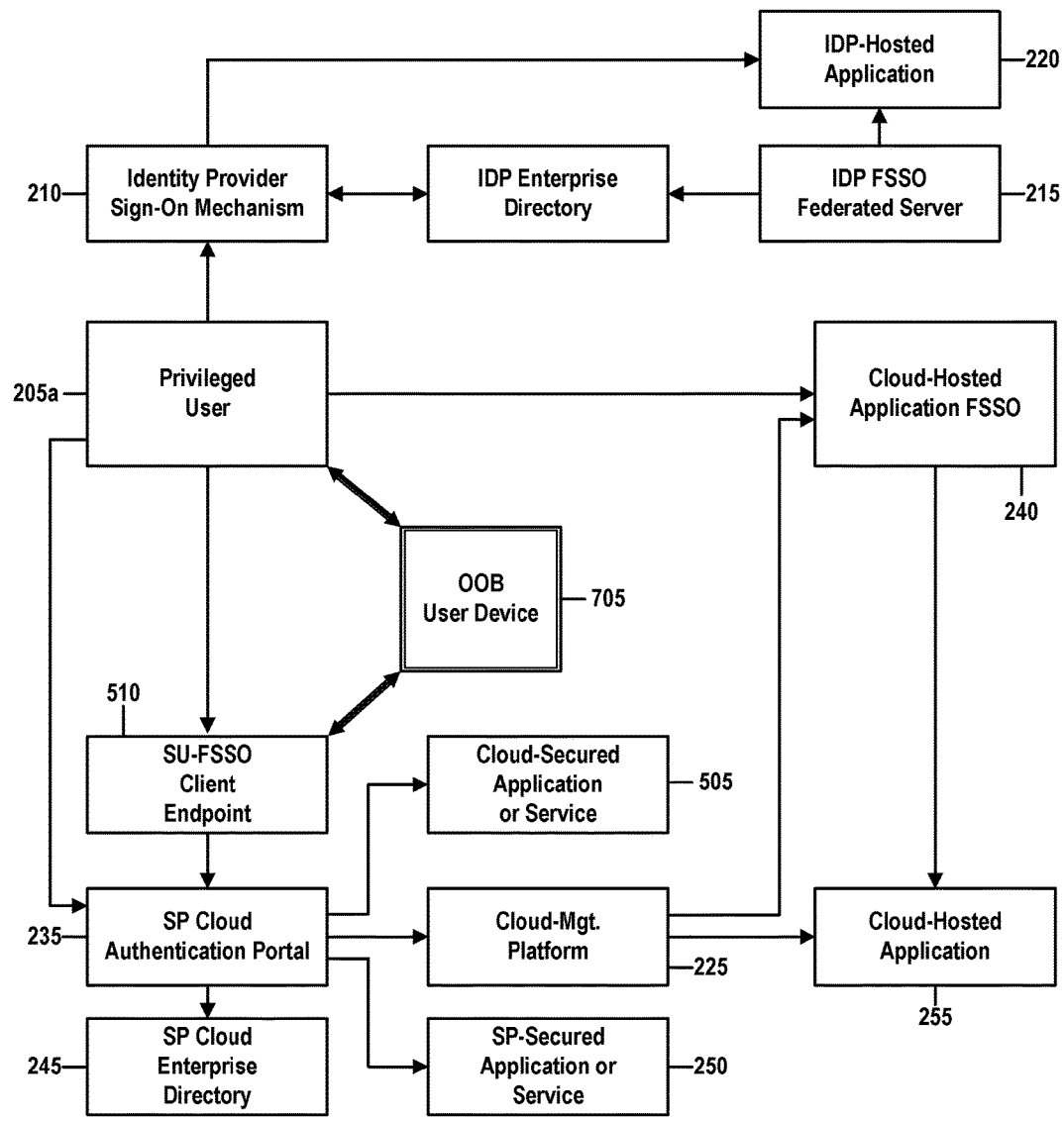
FIG. 7 is a structure diagram that shows an architecture of another enhanced version of the Federated Single Sign-On system of FIG. 2 in accordance with embodiments of the present invention.

FIG. 7 is a structure diagram that shows an architecture of another enhanced version of the Federated Single Sign-On system of FIG. 2 in accordance with embodiments of the present invention. FIG. 7 comprises elements identified by reference numbers 205a-255, 505-510, and 705.

Items 205a-255 and 505-510 are similar in form and function to similarly numbered items of FIG. 5.

As in embodiments described in FIGS. 5 and 6, in the embodiment of FIG. 7, SU-F-SSO endpoint 235 sends an on-demand password to user 205a, which user 205a may then use to gain access to a requested Service Provider cloud-hosted service or resource 255.

Unlike the earlier embodiments, however, in FIG. 7, this password is communicated to user 205a through an out-of-band device 705. Here, an out-of-band device is one that is not fully integrated into the federated components of the F-SSO architecture that comprises the Service Provider, the IDP, and the user 205a. Such a device might, for example, be a Web browser running on user 205a's personal notebook computer, tablet, smartphone, or other mobile device. In another example, the password might be communicated out-of-band as a voice message or as a Short Message Service (SMS) text message sent to a cell phone, or as an email, instant message, or other type of communication sent to a desktop computer or to any other computer that is not part of the F-SSO mechanism.

In another embodiment, the SU-F-SSO endpoint 510 may combine the embodiments of FIGS. 5 and 7, generating both an in-band on-demand password, communicated to user 205a through SU-F-SSO information flows described in FIG. 6, and a second out-of-band on-demand password, as described above. In some cases, user 205a may be allowed to choose which of these two passwords to use, and in other cases, both may be required.

Embodiments of FIG. 7 may be further revised to ensure that the IDP managing F-SSO tasks with the Service Provider transmit to the SP, in addition to other transmitted user information, an identifier of OOB device 705, such as a cell phone number, an IP address, or an email address.

In embodiments of FIG. 7 the on-demand password may not be constrained for single use, for a limited number of uses, for time-limited use, or in accordance with any of the other constraints described in FIG. 5. Embodiments may comprise usages of OOB password transmission, various types of constrained or single-use passwords, and combinations of in-band and out-of-band passwords, in any combination.

Figure 8:
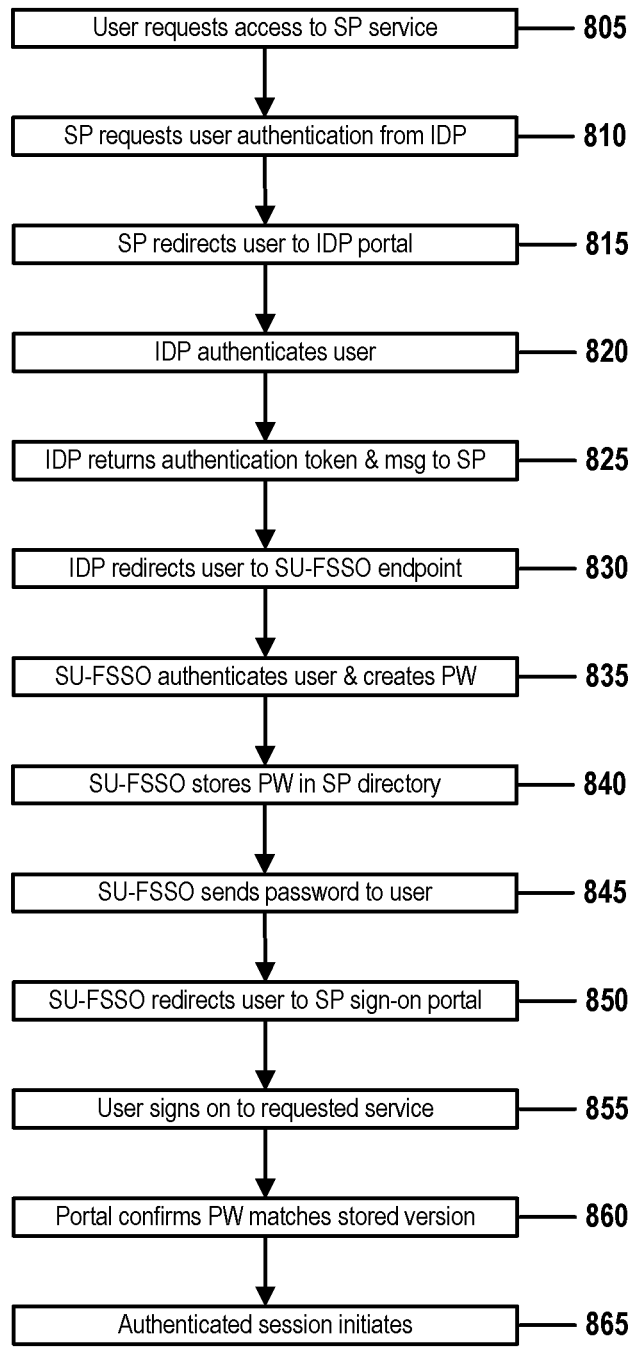
FIG. 8 is a flow chart that summarizes steps of a novel SU-F-SSO method in accordance with embodiments of the present invention described in FIGS. 5-7.

FIG. 8 is a flow chart that summarizes steps of a novel SU-F-SSO method in accordance with embodiments of the present invention described in FIGS. 5-7. FIG. 8 contains steps 805-865.

In step 805, one or more processors of a Service Provider participating in an SU-F-SSO federation determine that a user 205a has requested access to one or more applications or services 250. Here the SU-F-SSO federation may comprise one or more Service Provider and one or more Identity Providers. User 205a may request the service by any means known in the art, such as by clicking an HTTP hyperlink, launching an application, or manually selecting a feature of a software application.

In some embodiments, user 205a may request a service of the Service Provider from an application or service 220 that is hosted by an IDP, rather than from a resource or service of the Service Provider itself. In such cases, steps 810 and 815 are not required because there is no need for the Service Provider to notify the IDP that user-authentication is required, and there is no need to redirect user 205a to the IDP's domain, since user 205a is already logged into an IDP application or resource.

In step 810, the Service Provider confirms, based on internal or shared records accessible to the Service Provider, that user 205a is participating in the federated relationship with a particular Identity Provider. In response, the SP creates an F-SSO request for user-authentication and forwards that request to the Identity Provider. This request may be formatted in compliance with a standard or open format, protocol, or convention, such as SAML.

In step 815, the SP redirects user 205 to the IDP's sign-on Web site, portal, or other sign-on mechanism 210, where the IDP and the user 205a may more directly interact.

In step 820, the Identity Provider receives the SP's F-SSO request from the Service Provider. If the user does not already have a currently valid session with the IDP, the IDP authenticates the user, using any combination of identification or authentication methodologies known in the art and, in general, performing the authentication as a function of user information and other data stored in the IDP's enterprise directory 230, a federated F-SSO server 215, or another information repository.

In step 825, the IDP creates an authentication token, such as a SAML assertion, and an accompanying F-SSO message that authenticate the user 205a in response to user 205's service request in step 805. The IDP then returns the assertion and message to the Service Provider.

In step 830, having authenticated the user 205a, the IDP redirects user 205a back to the Service Provider. But here, instead of redirecting user 205a to a standard IDP-managed F-SSO endpoint 240, the user 205a is here redirected to the Service Provider's novel SU-F-SSO endpoint 510. This endpoint 510 may be a software application, Web site, or other facility capable of performing the functions ascribed to it by methods of FIG. 8.

In step 835, the SU-F-SSO endpoint 510 confirms and validates the user 205a's asserted trust relationship with the IDP, unpacks user-identifying information from F-SSO message received from the IDP, uses this information to validate the identify of user 205a, and configures an on-demand password for the user 205a.

In some embodiments, the SU-F-SSO endpoint 510 may in this step configure more than one password for user 205a, or may configure a distinct password for each of multiple uses 205a, and subsequent steps of FIG. 8 may be repeated accordingly for each password.

In step 840, the SU-F-SSO endpoint 510, by means of a cloud-specific API or of an open or otherwise known protocol, such as the Lightweight Directory Access Protocol (LDAP), forwards the one-time password to the Service Provider's cloud-hosted enterprise directory 245.

In step 845 the SP's SU-F-SSO endpoint 510, having received confirmation from the SP enterprise directory 245 that the password has been successfully received and used to update SP enterprise directory 245, prepares its response to the authenticated user 205a. This response may comprise the on-demand password and additional information about the requested cloud-hosted application or service 225.

As described in FIG. 5, this on-demand password may, in some embodiments, be a single-use password or may be constrained in other ways. The SU-F-SSO endpoint 510 then transmits the response to user 205a, which includes the on-demand password.

As described above, the SU-F-SSO endpoint 510 may, in some embodiments, transmit the on-demand password to the user 205a by means of conventional in-band communications within the scope of the federated SSO architecture, by means of an out-of-band mechanism, such as an SMS text message or an email message, or by means of a combination thereof.

In step 850, the SU-F-SSO endpoint 510 redirects authenticated user 205a to the Service Provider's sign-on portal 235.

In step 855, the user 205a, now under control of the SP's Cloud-Authentication Portal 235, may use the received on-demand password to sign on to the requested service 255.

In step 860, the sign-on portal 235 attempts to authenticate the on-demand password entered by the user 205a by confirming the entered password with the copy of the password stored in step 840 in the SP's enterprise directory 245.

In step 865, upon receiving confirmation from directory 245 that the password is valid, user 205a is deemed to have been authenticated.

In this step, the Service Provider may also configure session information for the user 205a, if such information had not been provided by the SU-F-SSO endpoint 510. In some embodiments, the Service Provider at this point may also forward to the SP portal 235 or to user 205a session-configuration information necessary for user 205a to continue to access the requested cloud-based application 255. In some embodiments, portal 235 may also at this time provide, to cloud-management platform 225 or to the requested application 255, additional session or security-related information needed to initiate a session for user 205a on requested application, service, or other resource 255.

If the user has not already gained access to requested resource 255, the SU-F-SSO endpoint 510 now redirects the user to requested resource 255. In some embodiments, this redirection may be performed at least in part by means of a cloud-management platform 225 that may manage infrastructure and cross-domain access on the cloud platform.

What is claimed is:

1. A method for using a Service-Provider password to simulate Single-Use Federated Single Sign-On (SU-F-SSO) functionality, the method comprising:
    a processor of a computerized Single-Use SU-F-SSO system receiving, from an Identity Provider of an F-SSO federation, a notification that a user has submitted a single sign-on request for a secured service of the Service Provider,
        where the secured service comprises multiple services that are each secured by one or more user-validation procedures,
        where the Identity Provider's pre-existing single sign-on authentication process cannot provide single sign-on access to the secured service,
        where the Identity Provider's pre-existing single sign-on authentication process, as a function of comparing information comprised by the single sign-on request with a set of trusted data, retrieved from a federated server of the F-SSO federation, that is associated with the user, authenticates the user's identity and identifies that the user possesses security privileges to access the secured service, and
        where the Identity Provider, as a function of the authenticating:
            has sent a response to the Service Provider indicating that the Identity Provider has authenticated the user,
            has notified the processor that the Identity Provider has authenticated the user, and
            has redirected the user to a SU-F-SSO endpoint managed by the Service Provider;
    the processor identifying the user and authenticating the user's privileges as a function of the notification;
    the processor creating an on-demand password;
    the processor storing a copy of the on-demand password in an information repository secured by the Service Provider;
    the processor transmitting the on-demand password to the user; and
    the processor redirecting the user to the Service Provider's logon portal,
        where the user is granted single-sign on access to the multiple services of the secured service in response to the user's submission of the on-demand password to the logon portal.

2. The method of claim 1, where the on-demand password is limited to a single use.

3. The method of claim 1, where the on-demand password is subject to constraints selected from a group consisting of: limiting the on-demand password to a certain number of uses; limiting the password to use during a single session of the secured service; limiting the password to use during a specified period of time; limiting the password to use during a specified period of time after the first use of the password; and requiring the user to perform an additional authentication procedure when entering the password.

4. The method of claim 1, where the on-demand password is transmitted to the user through an out-of-band communications method.

5. The method of claim 4, where the out-of-band communications method comprises a communication sent to a user-controlled destination that is not part of an F-SSO protocol exchange, where the out-of-band communication is selected from a group consisting of: a voice message; a fax; an SMS text message; an email message; a communication to a social-media service; an instant message; and a communication sent through the Internet to a software program running on a device that is accessible to the user.

6. The method of claim 1, where the notification is received in response to:
    the processor, in response to detecting that the user has requested access to the secured service from a portal under control of the Service Provider, redirecting the user to a portal under control of the IDP; and
    the processor requesting that the IDP identify and authenticate the user.

7. The method of claim 1, where the notification is received in response to a detection by the IDP that the user has requested access to the secured service from a portal under control of the IDP.

8. The method of claim 1, where the Service Provider is a cloud-computing service provider, the secured service is a cloud-based service deployed and controlled by the Service Provider on a cloud-computing platform provided by the Service Provider, and the IDP is a client of the Service Provider that controls an application deployed on the cloud-computing platform provided by the Service Provider.

9. The method of claim 1, where the notification comprises an F-SSO message that in turn comprises an authentication token.

10. The method of claim 9, where the F-SSO message and authentication token are formatted as one or more SAML assertions.

11. The method of claim 1, further comprising providing at least one support service for at least one of creating, integrating, hosting, maintaining, and deploying computer-readable program code in the computer system, where the computer-readable program code in combination with the computer system is configured to implement the receiving, the identifying, the creating, the storing, the transmitting, and the redirecting.

12. A Single-Use SU-F-SSO system comprising a processor, a memory coupled to the processor, and a computer-readable hardware storage device coupled to the processor, the storage device containing program code configured to be run by the processor via the memory to implement a method for using a Service-Provider password to simulate Single-Use Federated Single Sign-On (SU-F-SSO) functionality, the method comprising:

the processor receiving, from an Identity Provider of an F-SSO federation, a notification that a user has submitted a single sign-on request for a secured service of the Service Provider, where the secured service comprises multiple services that are each secured by one or more user-validation procedures, where the Identity Provider's pre-existing single sign-on authentication process cannot provide single sign-on access to the secured service, where the Identity Provider's pre-existing single sign-on authentication process, as a function of comparing information comprised by the single sign-on request with a set of trusted data, retrieved from a federated server of the F-SSO federation, that is associated with the user, authenticates the user's identity and identifies that the user possesses security privileges to access the secured service, and where the Identity Provider, as a function of the authenticating:

has sent a response to the Service Provider indicating that the Identity Provider has authenticated the user, has notified the processor that the Identity Provider has authenticated the user, and has redirected the user to a SU-F-SSO endpoint managed by the Service Provider;

the processor identifying the user and authenticating the user's privileges as a function of the notification;

the processor creating an on-demand password;

the processor storing a copy of the on-demand password in an information repository secured by the Service Provider;

the processor transmitting the on-demand password to the user; and the processor redirecting the user to the Service Provider's logon portal, where the user is granted single-sign on access to the multiple services of the secured service in response to the user's submission of the on-demand password to the logon portal.

13. The system of claim 12, where the on-demand password is limited to a single use.

14. The system of claim 12, where the on-demand password is subject to constraints selected from a group consisting of: limiting the on-demand password to a certain number of uses; limiting the password to use during a single session of the secured service; limiting the password to use during a specified period of time; limiting the password to use during a specified period of time after the first use of the password; and requiring the user to perform an additional authentication procedure when entering the password.

15. The system of claim 12, where the on-demand password is transmitted to the user through an out-of-band communications method, and where the out-of-band communications method comprises a communication sent to a user-controlled destination that is not part of an F-SSO protocol exchange, where the out-of-band communication is selected from a group consisting of: a voice message; a fax; an SMS text message; an email message; a communication to a social-media service; an instant message; and a communication sent through the Internet to a software program running on a device that is accessible to the user.

16. The system of claim 12, where the Service Provider is a cloud-computing service provider, the secured service is a cloud-based service deployed and controlled by the Service Provider on a cloud-computing platform provided by the Service Provider, and the IDP is a client of the Service Provider that controls an application deployed on the cloud-computing platform provided by the Service Provider.

17. A computer program product, comprising a computer-readable hardware storage device having a computer-readable program code stored therein, the program code configured to be executed by a Single-Use SU-F-SSO system comprising a processor, a memory coupled to the processor, and a computer-readable hardware storage device coupled to the processor, the storage device containing program code configured to be run by the processor via the memory to implement a method for using a Service-Provider password to simulate Single-Use Federated Single Sign-On (SU-F-SSO) functionality, the method comprising:

the processor receiving, from an Identity Provider of an F-SSO federation, a notification that a user has submitted a single sign-on request for a secured service of the Service Provider, where the secured service comprises multiple services that are each secured by one or more user-validation procedures, where the Identity Provider's pre-existing single sign-on authentication process cannot provide single sign-on access to the secured service, where the Identity Provider's pre-existing single sign-on authentication process, as a function of comparing information comprised by the single sign-on request with a set of trusted data, retrieved from a federated server of the F-SSO federation, that is associated with the user, authenticates the user's identity and identifies that the user possesses security privileges to access the secured service, and where the Identity Provider, as a function of the authenticating:

has sent a response to the Service Provider indicating that the Identity Provider has authenticated the user, has notified the processor that the Identity Provider has authenticated the user, and has redirected the user to a SU-F-SSO endpoint managed by the Service Provider;

the processor identifying the user and authenticating the user's privileges as a function of the notification;

the processor creating an on-demand password;

the processor storing a copy of the on-demand password in an information repository secured by the Service Provider;

the processor transmitting the on-demand password to the user; and the processor redirecting the user to the Service Provider's logon portal, where the user is granted single-sign on access to the multiple services of the secured service in response to the user's submission of the on-demand password to the logon portal.

18. The computer program product of claim 17, where the on-demand password is limited to a single use.

19. The computer program product of claim 17, where the on-demand password is transmitted to the user through an out-of-band communications method, and where the out-of-band communications method comprises a communication sent to a user-controlled destination that is not part of an F-SSO protocol exchange.

20. The computer program product of claim 17, where the Service Provider is a cloud-computing service provider, the secured service is a cloud-based service deployed and controlled by the Service Provider on a cloud-computing platform provided by the Service Provider, and the IDP is a client of the Service Provider that controls an application deployed on the cloud-computing platform provided by the Service Provider.

* * * * *